United States Patent
Chang

(10) Patent No.: US 10,268,327 B2
(45) Date of Patent: Apr. 23, 2019

(54) TOUCH SENSITIVE METHOD, APPARATUS AND ELECTRONIC SYSTEM FOR REDUCING INTERFERENCES FROM PIXEL UPDATE

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 19 days.

(21) Appl. No.: 15/599,910

(22) Filed: May 19, 2017

(65) Prior Publication Data

US 2017/0336892 A1 Nov. 23, 2017

Related U.S. Application Data

(60) Provisional application No. 62/338,671, filed on May 19, 2016.

(30) Foreign Application Priority Data

Dec. 30, 2016 (TW) .............................. 105144061 A

(51) Int. Cl.
*H04N 3/24* (2006.01)
*G06F 3/041* (2006.01)
*G06F 3/044* (2006.01)

(52) U.S. Cl.
CPC ............ *G06F 3/044* (2013.01); *G06F 3/0412* (2013.01); *H04N 3/24* (2013.01); *G09G 2310/0243* (2013.01)

(58) Field of Classification Search
CPC .................. G06F 3/044; G06F 3/0412; G09G 2310/0243; H04N 3/24
See application file for complete search history.

(56) References Cited

U.S. PATENT DOCUMENTS

| 9,207,481 | B2 * | 12/2015 | Takeuchi ............ G02F 1/13338 |
| 9,323,374 | B2 | 4/2016 | Noguchi et al. |
| 2013/0057511 | A1 * | 3/2013 | Shepelev ................ G06F 3/044 345/174 |
| 2013/0222279 | A1 | 8/2013 | Chang et al. |

FOREIGN PATENT DOCUMENTS

| TW | 201319891 | 5/2013 |
| TW | 201335809 | 9/2013 |

* cited by examiner

*Primary Examiner* — Muhammad N Edun
(74) *Attorney, Agent, or Firm* — WPAT, PC

(57) ABSTRACT

The present invention provides a touch sensitive method including: transmitting a driving signal via a first driving electrode of a touch screen during a first blanking interval; and sensing the driving signal via a plurality of sensing electrodes of the touch screen during the first blanking interval for detecting an external conductive object on or near the first driving electrode.

19 Claims, 5 Drawing Sheets

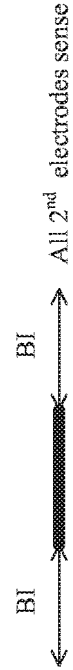
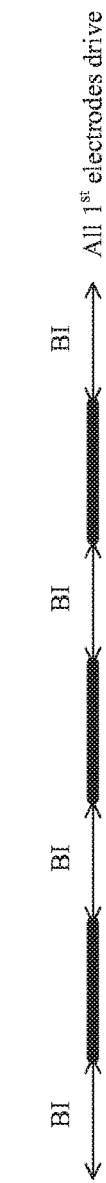
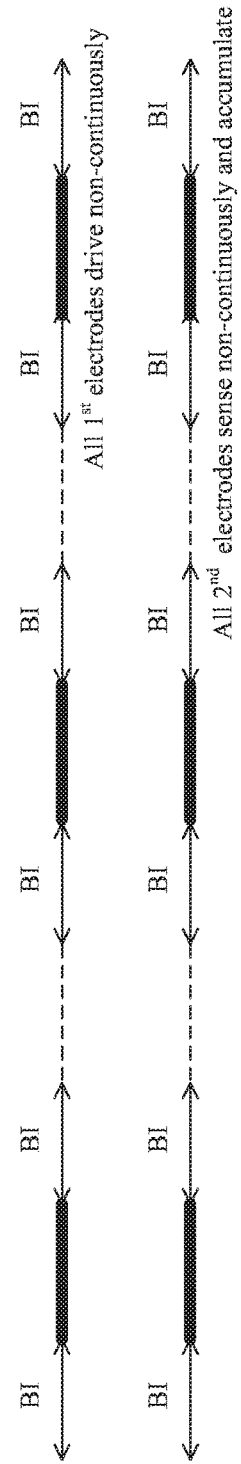
FIG. 2A
FIG. 2B
FIG. 2C

TOUCH SENSITIVE METHOD, APPARATUS AND ELECTRONIC SYSTEM FOR REDUCING INTERFERENCES FROM PIXEL UPDATE

CROSS REFERENCES TO RELATED APPLICATIONS

This application claims priority under 35 U.S.C. 119 to U.S. provisional patent application, 62/338,671, filed on May 19, 2016 and to Taiwan patent application, 105144061, filed on Dec. 30, 2016, the disclosures are incorporated herein by references.

FIELD OF THE INVENTION

The present application is related to touch sensitive method for a touch screen, and more particularly, to a method that performs touch control during blanking intervals between pixel update of a touch screen.

BACKGROUND OF THE INVENTION

In a dot-matrix display system, such as an existing LCD screen, a frame is typically considered as a display unit. Each frame includes N display lines, and each display line includes M dots or pixels. When a controller of the display system updates a frame, it typically updates sequentially every display line from top to bottom. When each display line is updated, pixels are typically updated from left to right.

After a display line is updated and before the next display line is updated, there is a time interval called a horizontal blanking interval (HBI). Therefore, when a frame has N display lines, there will be N−1 HBIs when updating the whole frame. After the last pixel of a frame is updated and before updating of the next frame begins, there is a time interval called a vertical blanking interval (VBI). In this application, the term "a blanking interval" is used to collectively refer to both a HBI and a VBI.

In general, when a particular display line is updated, voltages of different levels are applied to all of the pixel electrodes on that display line, so as to cause different degree of light transmission on the liquid crystal of each pixel. Assuming touch driving and sensing electrodes are provided on the top surface of the LCD, mutual capacitive sensing can be used to sense any external conductive object. When updating a display line, said voltages may cause capacitive sensing effects on the touch sensing electrodes. As result, in the signals received by the touch sensing electrodes, there are not only driving signals emitted by the touch driving electrodes, but also noises arising from updating the display line. This is most severe when the touch driving electrodes are in parallel to the display lines, i.e. the touch sensing electrodes are perpendicular to the display lines.

One objective of the present application is to eliminate or alleviate electromagnetic interferences on the touch sensing electrodes during the updating of the display lines of the screen. Another objective of the present application is to allow a touch processor to be aware of the timing information for the BIs.

SUMMARY OF THE INVENTION

In accordance with an embodiment, in order to avoid interferences from pixel update of a touch screen, the present invention provides a touch sensitive method, including: during a first blanking interval, transmitting a driving signal via a first driving electrode of a touch screen; and during the first blanking interval, detecting an object touching or in proximity to the first driving electrode by measuring the driving signal via a plurality of sensing electrodes of the touch screen.

In an embodiment, in order to increase the chance of detecting a touch/approaching object, the touch sensitive method further includes: in a plurality of blanking intervals including the first blanking interval, transmitting the driving signal via the first driving electrode; and during the plurality of blanking intervals, detecting an object touching or in proximity to the first driving electrode by measuring the driving signal via the plurality of sensing electrodes of the touch screen and accumulating the driving signals. In a variant, in order to increase the chance of detecting a touch/approaching object, the plurality of blanking intervals are a plurality of non-continuous horizontal blanking intervals.

In an embodiment, in order to reduce the time for full-screen detection, the touch sensitive method further includes: during the first blanking interval, transmitting the driving signal including a second pseudo-random number (PN) code via a second driving electrode, wherein the driving signal transmitted by the first driving electrode includes a first PN code driving signal; and during the first blanking interval, detecting the object touching or in proximity to the first driving electrode and the second driving electrode by measuring the driving signals via the plurality of sensing electrodes of the touch screen. In a variant, in order to increase the chance of detecting a touch/approaching object, the touch sensitive method further includes: in a plurality of blanking intervals including the first blanking interval, transmitting the driving signals via the first driving electrode and the second driving electrode; and during the plurality of blanking intervals, detecting the object touching or in proximity to the first and the second driving electrodes by measuring the driving signals via the plurality of sensing electrodes of the touch screen and accumulating the driving signals. In a variant, in order to increase the chance of detecting a touch/approaching object, the plurality of blanking intervals are a plurality of non-continuous horizontal blanking intervals.

In an embodiment, in order to determine if there is a touch/approaching object on the touch screen, the touch sensitive method further includes: during the first blanking interval, transmitting driving signals via all of driving electrodes of a touch screen; and during the first blanking interval, detecting the object touching or in proximity to the touch screen by measuring the driving signals via the plurality of sensing electrodes of the touch screen. In a variant, in order to increase the chance of detecting a touch/approaching object, the touch sensitive method further includes: in a plurality of blanking intervals including the first blanking interval, transmitting driving signals via all of the driving electrodes; and during the plurality of blanking intervals, detecting the object touching or in proximity to the touch screen by measuring the driving signals via the plurality of sensing electrodes of the touch screen and accumulating the driving signals. In a variant, in order to increase the chance of detecting the touch/approaching object, the plurality of blanking intervals are a plurality of non-continuous horizontal blanking intervals.

In an embodiment, in order for the received driving signals to have consistency, the touch sensitive method further includes: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

In accordance with an embodiment, in order to avoid interferences from pixel update of a touch screen, the present invention provides a touch sensitive processing apparatus, including: a driving circuit connected to a plurality of driving electrodes of a touch screen; a sensing circuit connected to a plurality of sensing electrodes of the touch screen; and a processor connected with the driving circuit and the sensing circuit for: during a first blanking interval, instructing the driving circuit to transmit a driving signal via a first driving electrode; and during the first blanking interval, detecting an object touching or in proximity to the first driving electrode by instructing the sensing circuit to measure the driving signal via the plurality of sensing electrode.

In an embodiment, in order to increase the chance of detecting a touch/approaching object, the processor is further used for: in a plurality of blanking intervals including the first blanking interval, instructing the driving circuit to transmit the driving signal via the first driving electrode; and during the plurality of blanking intervals, detecting the object touching or in proximity to the first driving electrode by instructing the sensing circuit to measure the driving signal via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order to reduce the time for full-screen detection, the processor is further used for: during the first blanking interval, instructing the driving circuit to transmit the driving signal including a second pseudo-random number (PN) code via a second driving electrode, wherein the driving signal transmitted by the first driving electrode includes a first PN code driving signal; and during the first blanking interval, detecting the object touching or in proximity to the first driving electrode and the second driving electrode by instructing the sensing circuit to measure the driving signals via the plurality of sensing electrodes. In a variant, in order to increase the chance of detecting a touch/approaching object, the processor is further used for: in a plurality of blanking intervals including the first blanking interval, instructing the driving circuit to transmit the driving signals via the first driving electrode and the second driving electrode; and during the plurality of blanking intervals, detecting the object touching or in proximity to the first and the second driving electrodes by instructing the sensing circuit to measure the driving signals via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order to determine if there is an object touching or in proximity to the touch screen, the processor is further used for: during the first blanking interval, instructing the driving circuit to transmit driving signals via all of the driving electrodes; and during the first blanking interval, detecting the object touching or in proximity to the touch screen by instructing the sensing circuit to measure the driving signals via the plurality of sensing electrodes. In a variant, in order to increase the chance of detecting a touch/approaching object, the processor is further used for: in a plurality of blanking intervals including the first blanking interval, instructing the driving circuit to transmit driving signals via all of the driving electrodes; and during the plurality of blanking intervals, detecting the object touching or in proximity to the touch screen by instructing the sensing circuit to measure the driving signals via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order for the received driving signals to have consistency, the processor is further used for: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

In accordance with an embodiment, in order to avoid interferences from pixel update of a touch screen, the present invention provides an electronic system, including: a touch screen, and a touch sensitive processing apparatus connected with the touch screen. The touch sensitive processing apparatus includes a driving circuit connected to a plurality of driving electrodes of the touch screen; a sensing circuit connected to a plurality of sensing electrodes of the touch screen; and a processor connected with the driving circuit and the sensing circuit for: during a first blanking interval, instructing the driving circuit to transmit a driving signal via a first driving electrode; and during the first blanking interval, detecting the object touching or in proximity to the first driving electrode by instructing the sensing circuit to measure the driving signal via the plurality of sensing electrode.

In conclusion, the touch sensitive method, apparatus and electronic system proposed by the present invention is able to reduce electromagnetic interferences on the touch control sensing electrodes during display line update of the touch screen.

BRIEF DESCRIPTION OF THE DRAWINGS

FIGS. 2A-2C are schematic diagrams illustrating touch sensitive methods in accordance with embodiments of the present invention.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1:
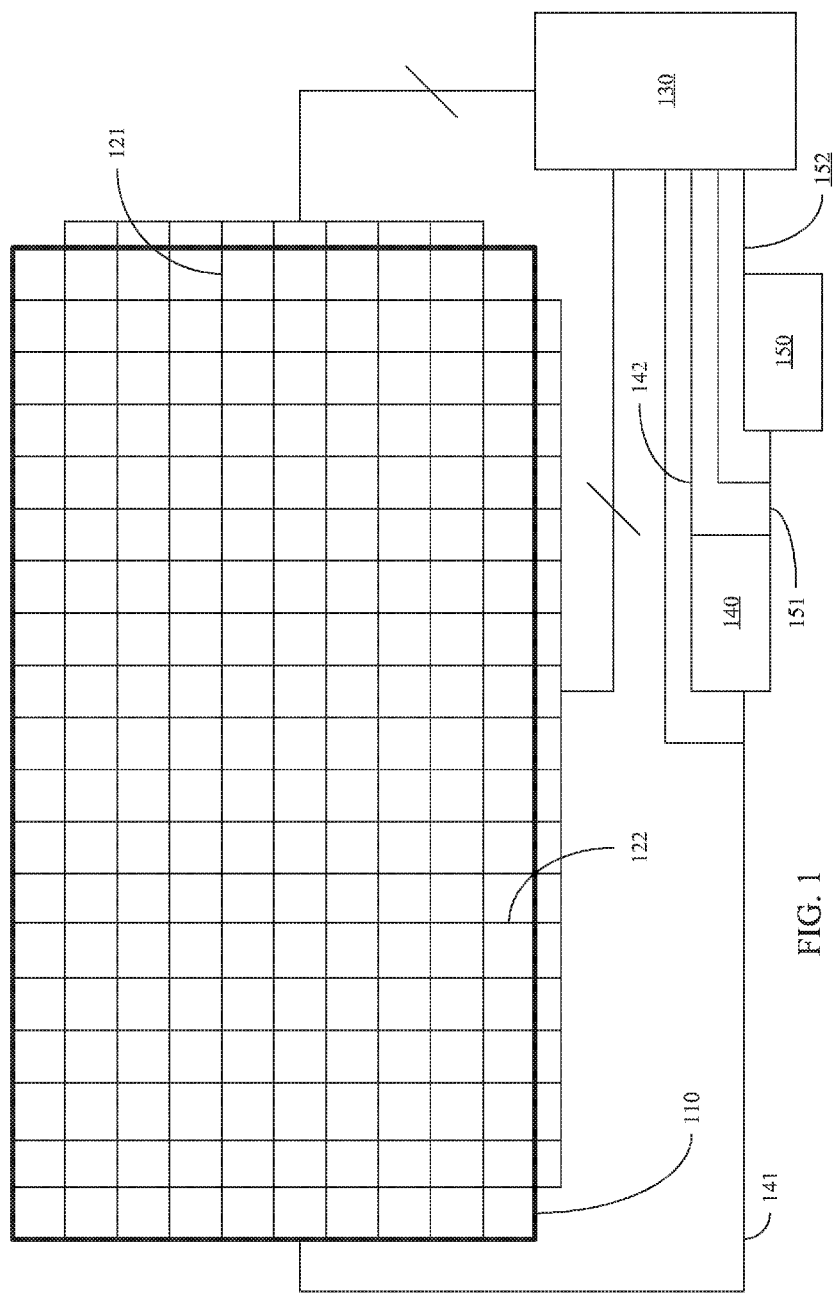
FIG. 1 is a schematic diagram illustrating an electronic system in accordance with an embodiment of the present invention.

Referring to FIG. 1, an electronic system in accordance with an embodiment of the present invention is shown. The electronic system includes a touch screen 110, a plurality of first electrodes 121 and a plurality of second electrodes 122 on or in the touch screen 110, and a touch sensitive processing apparatus 130 connected to the plurality of first electrodes 121 and the plurality of second electrodes 122. The electronic system further includes a display driver 140, which controls the dot-matrix display, i.e. the update of the frames, through the use of at least one display control lines 141 connected with the touch screen 110.

In an example, the electronic system may also include a graphics processor 150 for transmitting processed graphics information to the display driver 140 through the use of at least one graphics output line 151. The graphics output lines 151 can be transmission lines and protocols in conformity with, for example, Transition Minimized Differential Signaling (TMDS) standard, Low-Voltage Differential Signal (LVDS) standard or the like. The graphics output lines 151 may also be an interface, such as a Digital Video Interface (DVI), a High-Definition Multimedia Interface (HDMI), a VGA, a BNC, a S terminal, a RCA terminal, a DisplayPort, a Thunderbolt, a MHL, or the like.

The touch sensitive processing apparatus 130 may use various approaches to obtain the frame update information of the display driver 140, in other words, the timing information on when BIs begin. A first method includes connecting the touch sensitive processing apparatus 130 with the display control lines 141 and analyzing display control signals on the display control lines 141 in order to obtain the timing information on when BIs begin. A second method includes that the display driver 140 transmitting display control information to the touch sensitive processing apparatus 130 via at least one raster info lines 142. The display control information may include the timing information on when BIs begin. A third method includes connecting the touch sensitive processing apparatus 130 to the graphics output lines 151 and analyzing graphics output signals on the graphics output lines 151 in order to obtain the timing information on when HBIs and VBIs begin. A fourth method includes the graphics processor 150 transmitting graphics output signals to the touch sensitive processing apparatus 130 via at least one graphics info lines 152. The graphics output signals include the timing information on when BIs begin.

A fifth method includes that the touch sensitive processing apparatus 130, during a certain period of time, e.g. after starting up the electronic system, measuring signal values via the at least one first electrodes 121 and/or second electrodes 122. If the signal values exhibit some commonly seen pattern variations, then the timing information of the BI can be deduced from these pattern variations.

A sixth method includes that the touch sensitive processing apparatus 130 or its driver periodically or non-periodically asking the electronic system for parameters set for the display driver 140, such as the update rate and the resolution. For example, when the output format of the display driver 140 is set to 1080P and 60 Hz, then the touch sensitive processing apparatus 130 knows that there are 1024 display lines, a VBI will appear every ¹⁄₆₀ s, and a HBI will appear every 1(60*1024). Next, the fifth method described above can be used to measure the signal values, so that the timing information on when BIs begin can be determined based on the frequency at which the interference signals appear.

The present invention does not limit as to how the touch sensitive processing apparatus 130 obtain the timing information on when BIs begin, and is not limited to one or more of the six methods described before. Accordingly, the present invention provides a method and an apparatus for allowing a touch sensitive processing apparatus to obtain timing information on BIs. After timing information on the HBIs and the VBIs are obtained, the touch sensitive processing apparatus 130 may then perform mutual capacitive detection during a HBI and/or a VBI in order to eliminate or alleviate electromagnetic interferences on the touch control sensing electrodes during the display line update of the screen.

A first mutual capacitive detection implementation involves a full-screen driving detection as shown in FIGS. 2A-2C. In FIG. 2A, in a single BI, a full-screen driving detection can be performed, that is, all of the first electrodes 121 are instructed to emit driving signals, and all of the second electrodes 122 are instructed to perform measurements. The touch sensitive processing apparatus 130 can determine if an external conductive object is touching/approaching the touch screen 110 based on if any measured signals exceed a threshold. In an example, as shown in FIG. 2B, full-screen driving can be performed in a plurality of continuous BIs, and signals measured in these BIs are accumulated, that is, a plurality of measured signals of the same second electrode are accumulated to determine if any sums of the measured signals exceed a threshold. In another example, as shown in FIG. 2C, full-screen driving can be performed in a plurality of non-continuous BIs, and signals measured in these BIs are accumulated, that is, a plurality of measured signals of the same second electrode are accumulated to determine if any sums of the measured signals exceed a threshold.

Since full-screen driving requires more power, so a full-screen driving detection can be performed in adjacent VBIs with a longer time interval in order to reduce power consumption. Of course, a full-screen driving detection can be performed in non-adjacent VBIs or HBIs to reduce power consumption.

Figures 3A, 3B, 3C:
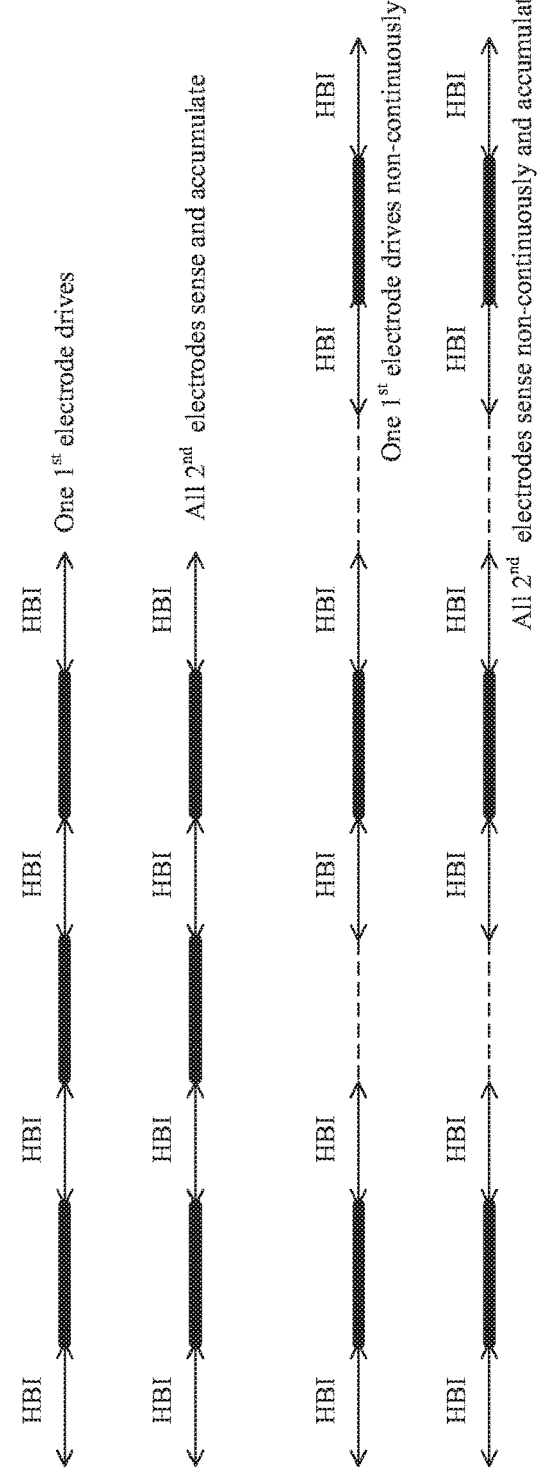
FIGS. 3A-3C are schematic diagrams illustrating touch sensitive methods in accordance with embodiments of the present invention.

A second mutual capacitive detection implementation involves individual driving detection as shown in FIGS. 3A-3C. In FIG. 3A, in a single HBI, driving detection of a single first electrode 121 can be performed, that is, a driving signal is provided to a particular first electrode 121 and all of the second electrodes 122 are instructed to perform measurements. In FIGS. 3B and 3C, driving detection of a single first electrode 121 can be performed in a plurality of adjacent or non-adjacent HBIs, and all of the second electrodes 122 are instructed to perform measurements, and the measured signals for every second electrodes are accumulated respectively. All of the three approaches allow detection of an external conductive object touching/approaching the first electrode 121. If individual driving detection is performed in turn on all of the first electrodes 121, then it is possible to detect a plurality of touching/approaching object on the entire touch screen 110. The term "in turn" here means in accordance or not in accordance with the order in which the first electrodes 121 are physically arranged.

Figure 4A:
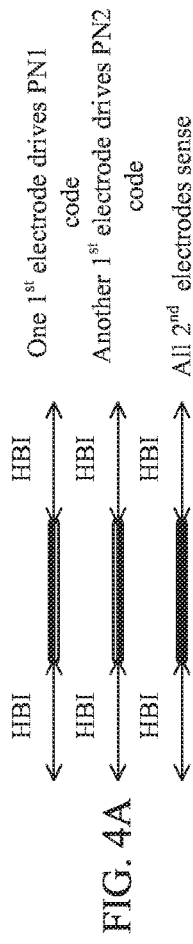
FIGS. 4A-4C are schematic diagrams illustrating touch sensitive methods in accordance with embodiments of the present invention.
Figure 4B:
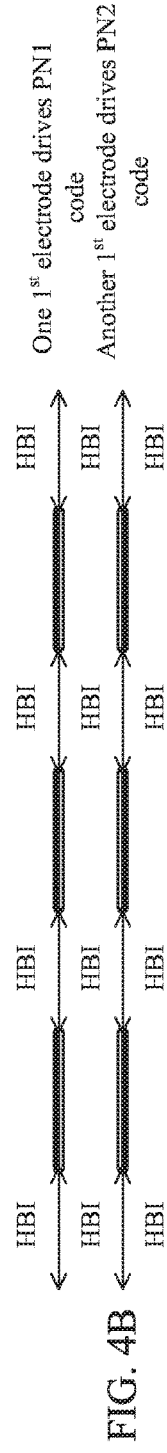
Figure 4C:
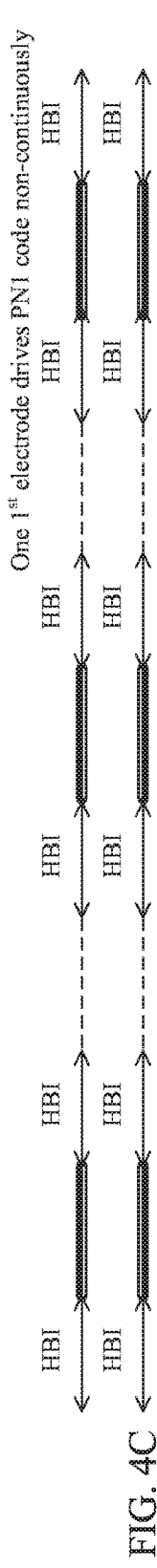

A third mutual capacitive detection implementation involves multiple-driving detection as shown in FIGS. 4A-4C. In FIG. 4A, driving detection of two or more first electrodes 121 can be performed in a single HBI, that is, in a HBI, a Pseudo-random Number (PN) one driving signal PN1 is provided to a particular first electrode 121, while providing a Pseudo-random number two driving signal PN2 to another first electrode 121, and all of the second electrodes 122 are instructed to perform measurements. Then, the touch sensitive processing apparatus 130 can determine the signal quantities of PN1 and PN2 based on the measured signals to determine if any external conductive object is touching/approaching these two first electrodes 121. Although two first electrodes 121 and two pseudo-random numbers PN1 and PN2 are used for illustration in FIG. 4, one can appreciate the use of Q first electrodes emitting Q pseudo-random numbers PN1 to PNq. In FIGS. 4B and 4C, driving detection of multiple first electrodes 121 can be performed in a plurality of adjacent or non-adjacent HBIs, and all of the second electrodes 122 are instructed to perform measurements, and the measured signals for every second electrodes are accumulated respectively. All of the three approaches allow detection of an external conductive object touching/approaching the first electrodes 121. If multiple-driving detection is performed in turn on all of the first electrodes 121, then it is possible to detect a plurality of touching/approaching object on the entire touch screen 110. The term "in turn" here means in accordance or not in accordance with the order in which the first electrodes 121 are physically arranged.

A fourth mutual capacitive detection implementation involves updating baseline values for mutual capacitive detection. When the touch sensitive processing apparatus 130 determines there is no external conductive object near or touching the touch screen 110, any of the approaches described with reference to the embodiments of FIG. 3A-3C or 4A-4C can be used to obtain signals unperturbed by the update of the display lines and used them as the baseline values for mutual capacitive detection. Although the embodiments shown in FIGS. 3A-3C and 4A-4C both use HBIs as an example, it can be appreciated that VBIs may equally be used.

In addition, in the individual driving detection and multiple-driving detection described above, the distance of the first electrode(s) 121 from a sensor to which the second electrode 122 is connected can be taken into consideration to adjust the voltages of the driving signals and the driving durations, or parameters such as the gain, the receiving duration, a delay time for the receiving time of the sensor to which the second electrode 122 is connected.

For example, if a driving circuit emits a driving signal via a first electrode 121 at the upper region of FIG. 1, the sensed current will need to travel the whole length of a second electrode 122 to reach a sensing circuit on the touch sensitive processing apparatus 130. However, if a driving circuit emits a driving signal via a first electrode 121 at the lower region of FIG. 1, the sensed current only needs to travel a smaller portion of the second electrode 122 to reach the sensing circuit on the touch sensitive processing apparatus 130. Therefore, parameters related to the driving circuit and the sensing circuit can be adjusted based on the location of the first electrode 121 emitting the driving signal. These adjustments can be made at the Analog Front-End (AFE) or the digital back end.

Furthermore, in the examples of FIGS. 2A to 4C, neither of the driving time of the driving circuit nor the sensing time of the sensing circuit occupies the BIs. However, after the above adjustment(s), the driving time and the sensing time may overlap with the BIs.

Moreover, although the above descriptions are all applied to mutual capacitive detection, however, after getting the BI information, the touch processor may use this BI timing information for other types of detections. For example, scanning of interference signals can be performed in the BIs, or self-capacitive detection can be performed in the BIs. In summary, regardless of which type of touch control detection is used, the present application should achieve the objective of eliminating or alleviating electromagnetic interferences on the touch control sensing electrodes during updating of the display lines of the screen.

Figure 5:
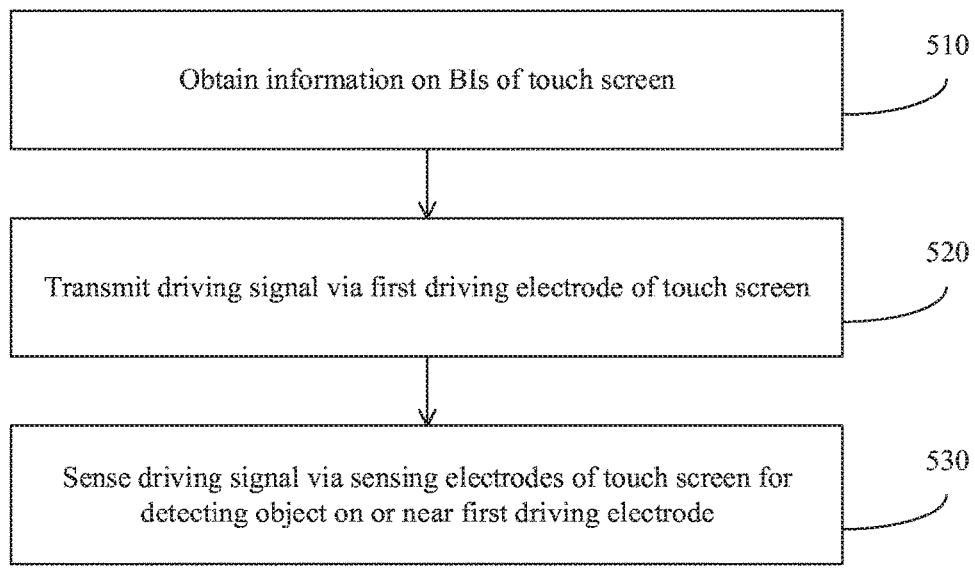
FIG. 5 is a flowchart illustrating a touch sensitive method in accordance with an embodiment of the present invention.

Referring to FIG. 5, which is a flowchart illustrating a touch sensitive method in accordance with an embodiment of the present invention is shown. In order to avoid interferences from pixel update of a touch screen, the method is applicable to the touch sensitive processing apparatus 130 shown in FIG. 1. The touch sensitive method may include, but is not limited to, the following steps. In step 510, information on blanking intervals of a touch screen is obtained. Any of the six methods described above can be used to obtain the information on BIs. Next, in step 520, driving signal is emitted by a first driving electrode of the touch screen. Finally, in step 530, the driving signal is sensed via a plurality of sensing electrodes of the touch screen to detect an object touching/approaching the first driving electrode.

Figure 6:
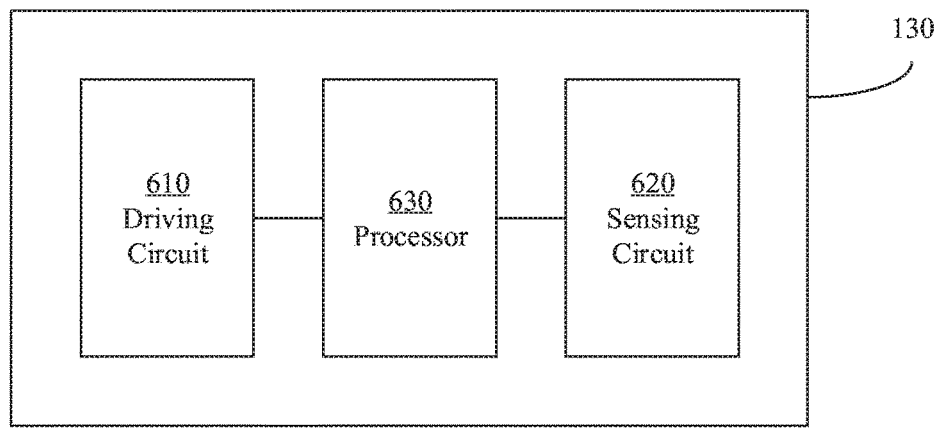
FIG. 6 is a schematic block diagram illustrating a touch sensitive processing apparatus in accordance with an embodiment of the present invention.

Referring to FIG. 6, which is a block diagram illustrating a touch sensitive processing apparatus in accordance with an embodiment of the present invention. The touch sensitive processing apparatus 130 is applicable to the electronic system of FIG. 1, and includes a driving circuit 610 connected with various first electrodes or driving electrodes of a touch screen. The touch sensitive processing apparatus 130 may further include a sensing circuit 620 connected with various second electrodes or sensing electrodes o the touch screen. The touch sensitive processing apparatus 130 may further include a processor 630 connected with the driving circuit 610 and the sensing circuit 510, which includes various combinations of software and hardware for implementing the embodiments described above, in particular, the touch sensitive method shown in FIG. 5.

In accordance with an embodiment, in order to avoid interferences from pixel update of a touch screen, the present invention provides a touch sensitive method, including: during a first blanking interval, transmitting a driving signal via a first driving electrode of a touch screen; and during the first blanking interval, detecting an object touching or in proximity to the first driving electrode by measuring the driving signal via a plurality of sensing electrodes of the touch screen.

In an embodiment, in order to increase the chance of detecting a touch/approaching object, the touch sensitive method further includes: in a plurality of blanking intervals including the first blanking interval, transmitting the driving signal via the first driving electrode; and during the plurality of blanking intervals, detecting the object touching or in proximity to the first driving electrode by measuring the driving signal via the plurality of sensing electrodes of the touch screen and accumulating the driving signals. In a variant, in order to increase the chance of detecting a touch/approaching object, the plurality of blanking intervals are a plurality of non-continuous horizontal blanking intervals.

In an embodiment, in order to reduce the time for full-screen detection, the touch sensitive method further includes: during the first blanking interval, transmitting the driving signal including a second pseudo-random number (PN) code via a second driving electrode, wherein the driving signal transmitted by the first driving electrode includes a first PN code driving signal; and during the first blanking interval, detecting the object touching or in proximity to the first driving electrode and the second driving electrode by measuring the driving signals via the plurality of sensing electrodes of the touch screen. In a variant, in order to increase the chance of detecting a touch/approaching object, the touch sensitive method further includes: in a plurality of blanking intervals including the first blanking interval, transmitting the driving signals via the first driving electrode and the second driving electrode; and during the plurality of blanking intervals, detecting the object touching or in proximity to the first and the second driving electrodes by measuring the driving signals via the plurality of sensing electrodes of the touch screen and accumulating the driving signals. In a variant, in order to increase the chance of detecting touch/approaching object, the plurality of blanking intervals are a plurality of non-continuous horizontal blanking intervals.

In an embodiment, in order to determine if there is a touch/approaching object on the touch screen, the touch sensitive method further includes: during the first blanking interval, transmitting driving signals via all of driving electrodes of a touch screen; and during the first blanking interval, detecting the object touching or in proximity to the touch screen by measuring the driving signals via the plurality of sensing electrodes of the touch screen. In a variant, in order to increase the chance of detecting a touch/approaching object, the touch sensitive method further includes: in a plurality of blanking intervals including the first blanking interval, transmitting driving signals via all of the driving electrodes; and during the plurality of blanking intervals, detecting the object touching or in proximity to the touch screen by measuring the driving signals via the plurality of sensing electrodes of the touch screen and accumulating the driving signals. In a variant, in order to increase the chance of detecting a touch/approaching object, the plurality of blanking intervals are a plurality of non-continuous horizontal blanking intervals.

In an embodiment, in order for the received driving signals to have consistency, the touch sensitive method further includes: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

In accordance with an embodiment, in order to avoid interferences from pixel update of a touch screen, the present invention provides a touch sensitive processing apparatus, including: a driving circuit connected to a plurality of driving electrodes of a touch screen; a sensing circuit connected to a plurality of sensing electrodes of the touch screen; and a processor connected with the driving circuit and the sensing circuit for: during a first blanking interval, instructing the driving circuit to transmit a driving signal via a first driving electrode; and during the first blanking interval, detecting an object touching or in proximity to the first driving electrode by instructing the sensing circuit to measure the driving signal via the plurality of sensing electrode.

In an embodiment, in order to increase the chance of detecting a touch/approaching object, the processor is further used for: in a plurality of blanking intervals including the first blanking interval, instructing the driving circuit to transmit the driving signal via the first driving electrode; and during the plurality of blanking intervals, detecting the object touching or in proximity to the first driving electrode by instructing the sensing circuit to measure the driving signal via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order to reduce the time for full-screen detection, the processor is further used for: during the first blanking interval, instructing the driving circuit to transmit the driving signal including a second pseudo-random number (PN) via a second driving electrode, wherein the driving signal transmitted by the first driving electrode includes a first PN driving signal; and during the first blanking interval, detecting the object touching or in proximity to the first driving electrode and the second driving electrode by instructing the sensing circuit to measure the driving signals via the plurality of sensing electrodes. In a variant, in order to increase the chance of detecting a touch/approaching object, the processor is further used for: in a plurality of blanking intervals including the first blanking interval, instructing the driving circuit to transmit the driving signals via the first driving electrode and the second driving electrode; and during the plurality of blanking intervals, detecting the object touching or in proximity to the first and the second driving electrodes by instructing the sensing circuit to measure the driving signals via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order to determine if there is an object touching or in proximity to the touch screen, the processor is further used for: during the first blanking interval, instructing the driving circuit to transmit driving signals via all of the driving electrodes; and during the first blanking interval, detecting the object touching or in proximity to the touch screen by instructing the sensing circuit to measure the driving signals via the plurality of sensing electrodes. In a variant, in order to increase the chance of detecting a touch/approaching object, the processor is further used for: in a plurality of blanking intervals including the first blanking interval, instructing the driving circuit to transmit driving signals via all of the driving electrodes; and during the plurality of blanking intervals, detecting the object touching or in proximity to the touch screen by instructing the sensing circuit to measure the driving signals via the plurality of sensing electrodes and accumulating the driving signals. In a variant, in order to increase the chance of detecting a touch/approaching object, the plurality of blanking intervals are a plurality of non-continuous horizontal blanking intervals.

In an embodiment, in order for the received driving signals to have consistency, the processor is further used for: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

In accordance with an embodiment, in order to avoid interferences from pixel update of a touch screen, the present invention provides an electronic system, including: a touch screen, and a touch sensitive processing apparatus connected with the touch screen. The touch sensitive processing apparatus includes a driving circuit connected to a plurality of driving electrodes of the touch screen; a sensing circuit connected to a plurality of sensing electrodes of the touch screen; and a processor connected with the driving circuit and the sensing circuit for: during a first blanking interval, instructing the driving circuit to transmit a driving signal via a first driving electrode; and during the first blanking interval, detecting the object touching or in proximity to the first driving electrode by instructing the sensing circuit to measure the driving signal via the plurality of sensing electrode.

In conclusion, the touch sensitive method, apparatus and electronic system proposed by the present invention is able to reduce electromagnetic interferences on the touch control sensing electrodes during display line update of the touch screen.

What is claimed is:

1. A touch sensitive method comprising:
   during a first blanking interval, transmitting a driving signal including a first pseudo-random number (PN) code via a first driving electrode of a touch screen;
   during the first blanking interval, transmitting the driving signal including a second PN code via a second driving electrode of the touch screen; and
   during the first blanking interval, detecting an object touching or in proximity to the first driving electrode and the second driving electrode by measuring the driving signal via a plurality of sensing electrodes of the touch screen.

2. The touch sensitive method of claim 1, further comprising:
   in a plurality of blanking intervals including the first blanking interval, transmitting the driving signal via the first driving electrode; and
   during the plurality of blanking intervals, detecting the object touching or in proximity to the first driving electrode by measuring the driving signal via the plurality of sensing electrodes of the touch screen and accumulating the driving signals.

3. The touch sensitive method of claim 1, further comprising:
   in a plurality of blanking intervals including the first blanking interval, transmitting the driving signals via the first driving electrode and the second driving electrode; and
   during the plurality of blanking intervals, detecting the object touching or in proximity to the first and the second driving electrodes by measuring the driving signals via the plurality of sensing electrodes and accumulating the driving signals.

4. The touch sensitive method of claim 3, wherein the plurality of blanking intervals are a plurality of non-continuous horizontal blanking intervals.

5. The touch sensitive method of claim 1, further comprising:
   during the first blanking interval, transmitting driving signals via all of driving electrodes of the touch screen; and
   during the first blanking interval, detecting the object touching or in proximity to the touch screen by measuring the driving signals via the plurality of sensing electrodes.

6. The touch sensitive method of claim 5, further comprising:
   in a plurality of blanking intervals including the first blanking interval, transmitting the driving signals via all of the driving electrodes; and
   during the plurality of blanking intervals, detecting the object touching or in proximity to the touch screen by measuring the driving signals via the plurality of sensing electrodes of the touch screen and accumulating the driving signals.

7. The touch sensitive method of claim 6, wherein the plurality of blanking intervals are a plurality of non-continuous horizontal blanking intervals.

8. The touch sensitive method of claim 1, further comprising: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

9. The touch sensitive method of claim 2, wherein the plurality of blanking intervals are a plurality of non-continuous horizontal blanking intervals.

10. A touch sensitive processing apparatus, comprising:
    a driving circuit connected to a plurality of driving electrodes of a touch screen;
    a sensing circuit connected to a plurality of sensing electrodes of the touch screen; and
    a processor connected with the driving circuit and the sensing circuit for:
      during a first blanking interval, instructing the driving circuit to transmit a driving signal including a first pseudo-random number (PN) code via a first driving electrode;
      during the first blanking interval, instructing the driving circuit to transmit the driving signal including a second PN code via a second driving electrode of the touch screen; and
      during the first blanking interval, detecting an object touching or in proximity to the first driving electrode and the second driving electrode by instructing the sensing circuit to measure the driving signal via the plurality of sensing electrode.

11. The touch sensitive processing apparatus of claim 10, wherein the processor is further used for:
    in a plurality of blanking intervals including the first blanking interval, instructing the driving circuit to transmit the driving signal via the first driving electrode; and
    during the plurality of blanking intervals, detecting the object touching or in proximity to the first driving electrode by instructing the sensing circuit to measure the driving signal via the plurality of sensing electrodes and accumulating the driving signals.

12. The touch sensitive processing apparatus of claim 11, wherein the plurality of blanking intervals are a plurality of non-continuous horizontal blanking intervals.

13. The touch sensitive processing apparatus of claim 10, wherein the processor is further used for:
    in a plurality of blanking intervals including the first blanking interval, transmitting the driving signals via the first driving electrode and the second driving electrode; and
    during the plurality of blanking intervals, detecting the object touching or in proximity to the first and the second driving electrodes by measuring the driving signals via the plurality of sensing electrodes and accumulating the driving signals.

14. The touch sensitive processing apparatus of claim 13, wherein the plurality of blanking intervals are a plurality of non-continuous horizontal blanking intervals.

15. The touch sensitive processing apparatus of claim 10, wherein the processor is further used for:
    during the first blanking interval, transmitting driving signals via all of driving electrodes of the touch screen; and during the first blanking interval, detecting the object touching or in proximity to the touch screen by measuring the driving signals via the plurality of sensing electrodes.

16. The touch sensitive processing apparatus of claim 15, wherein the processor is further used for:
   in a plurality of blanking intervals including the first blanking interval, transmitting the driving signals via all of the driving electrodes; and
   during the plurality of blanking intervals, detecting the object touching or in proximity to the touch screen by measuring the driving signals via the plurality of sensing electrodes of the touch screen and accumulating the driving signals.

17. The touch sensitive processing apparatus of claim 16, wherein the plurality of blanking intervals are a plurality of non-continuous horizontal blanking intervals.

18. The touch sensitive processing apparatus of claim 10, wherein the processor is further used for: adjusting the following based on the distance of the first driving electrode from a sensor to which the plurality of sensing electrodes are connected: the level of voltage of the driving signal, the driving duration, the gain of the sensor, the sensing duration, a delay time for the sensing time point, or a combination of the above.

19. An electronic system comprising:
a touch screen, and
a touch sensitive processing apparatus connected with the touch screen, including:
   a driving circuit connected to a plurality of driving electrodes of the touch screen;
   a sensing circuit connected to a plurality of sensing electrodes of the touch screen; and
   a processor connected with the driving circuit and the sensing circuit for:
      during a first blanking interval, instructing the driving circuit to transmit a driving signal including a first pseudo-random number (PN) code via a first driving electrode;
      during the first blanking interval, instructing the driving circuit to transmit the driving signal including a second PN code via a second driving electrode of the touch screen; and
   during the first blanking interval, detecting an object touching or in proximity to the first driving electrode and the second driving electrode by instructing the sensing circuit to measure the driving signal via the plurality of sensing electrode.

* * * * *